(12) United States Patent
Mingo et al.

(10) Patent No.: US 6,604,411 B1
(45) Date of Patent: Aug. 12, 2003

(54) ENGINE STARTING METHOD

(75) Inventors: Paul Charles Mingo, Farmington Hills, MI (US); Xiaoying Zhang, Dearborn Hights, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 09/394,294

(22) Filed: Sep. 10, 1999

(51) Int. Cl.[7] ................................................. G01L 3/26
(52) U.S. Cl. ........................................................ 73/117.3
(58) Field of Search ............................... 73/116, 117.2, 73/117.3

(56) References Cited

U.S. PATENT DOCUMENTS

| 4,335,599 A | * | 6/1982 | Kohler ........................... 73/116 |
| 4,338,813 A | * | 7/1982 | Hunninghaus et al. ........ 73/116 |
| 4,926,822 A | | 5/1990 | Abe et al. |
| 5,309,757 A | | 5/1994 | Hashimoto et al. |
| 5,460,134 A | * | 10/1995 | Ott et al. ...................... 123/476 |
| 5,548,995 A | | 8/1996 | Clinton et al. |
| 5,604,304 A | | 2/1997 | Kokubo et al. |
| 5,699,769 A | | 12/1997 | Uchinami et al. |
| 5,746,183 A | | 5/1998 | Parke et al. |
| 5,767,394 A | | 6/1998 | Butts et al. |
| 5,823,166 A | | 10/1998 | Entenmann et al. |
| 5,934,259 A | * | 8/1999 | Onishi ........................... 123/491 |

* cited by examiner

Primary Examiner—Edward Lefkowitz
Assistant Examiner—Maurice Stevens
(74) Attorney, Agent, or Firm—Julie Voutyras; Allan J. Lippa

(57) ABSTRACT

A method for determining engine position during engine starting is described wherein cylinder identification is determined based on either the absence or presence of a cylinder identification signal. The approach is used when it is determined that engine speed is large enough so that the cylinder identification signal can be recognized.

19 Claims, 2 Drawing Sheets

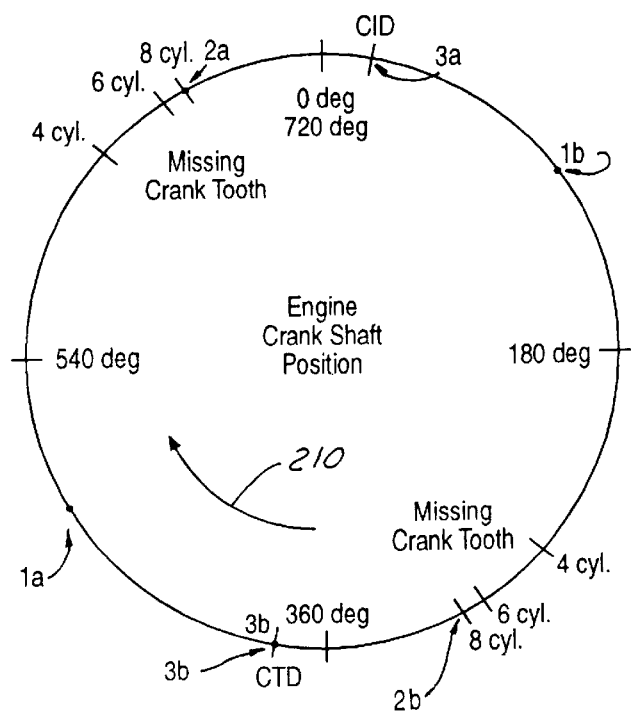
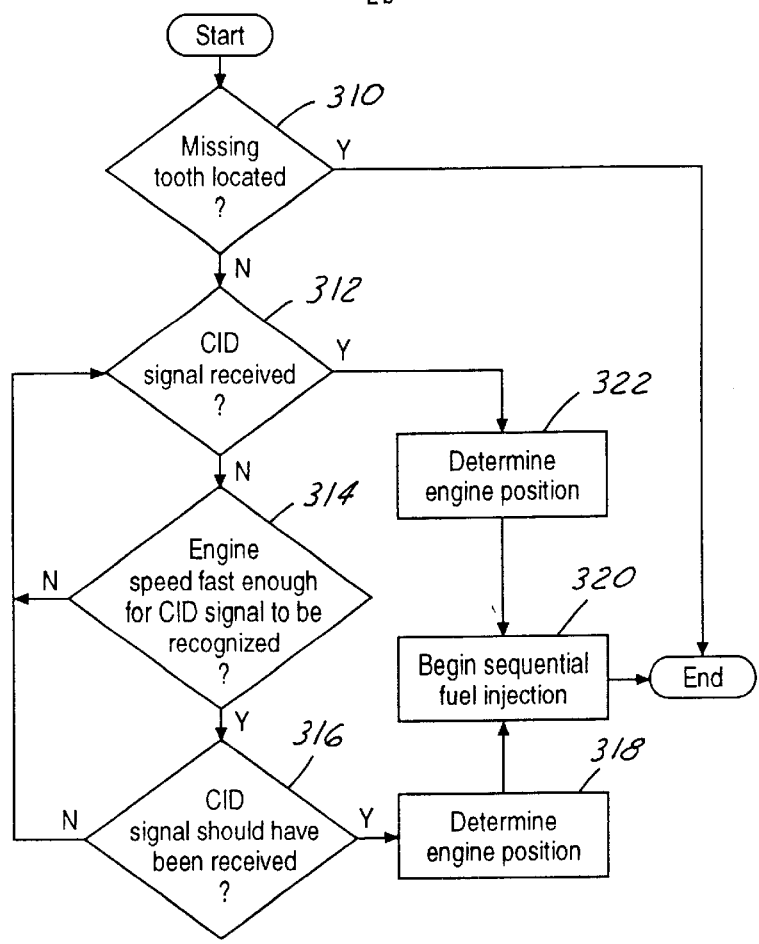
FIG. 2
FIG. 3

ENGINE STARTING METHOD

FIELD OF THE INVENTION

This invention relates starting of an internal combustion engine and particularly to determining engine position during starting.

BACKGROUND OF THE INVENTION

Engine position is conventionally determined using crankshaft position information. The crankshaft position information is typically produced using a toothed wheel with a missing tooth, so that an engine control module can determine relative engine position to each cylinder. However, since the crankshaft rotates twice per engine cycle, information for the crankshaft can only locate engine position to one of two possibilities. To determine the unique engine position, additional information is used. Typically, this information is provided from a cylinder identification (CID) signal coupled to a camshaft. Thus, the engine control module can therefore uniquely determine relative engine position to each cylinder.

During conventional engine starting, the engine control module waits to receive the CID signal before commencing sequential fuel injection, since sequential fuel injection requires unique identification of engine position. In other words, since the CID signal is provided only once per 2 revolutions of the engine, it takes a certain amount of time to uniquely determine engine position. Therefore, there is a certain delay time before sequential fuel injection can commence. Such a system is described in U.S. Pat. No. 5,548,995.

The inventor herein has recognized a disadvantage with the above approach. In particular, since it can take as many as 2 engine revolution before sequential fuel injection can commence, increased starting time can occur, which degrades customer satisfaction. Conventional approaches in reducing engine start time require injection of fuel using all fuel injectors, since unique engine position is unknown, and any cylinder may be inducting. The inventor herein has recognized that if engine position can be more quickly determined, it may be possible to reduce the amount of fuel injected into cylinders not currently inducting fuel and air while providing acceptable engine starting times.

SUMMARY OF THE INVENTION

An object of the invention herein is to quickly determine engine position during engine starting.

The above object is achieved and disadvantages of prior approaches overcome by a method for determining engine position, the engine having a camshaft and a crankshaft, the method comprising the steps of: determining cylinder identification when a camshaft measurement is received; and determining cylinder identification after a predetermined amount of crankshaft rotation when an operating condition is such that said camshaft measurement is receivable and said camshaft measurement is absent.

Thus, according to the present invention, engine position can be determined using either the absence or presence of the camshaft measurement. In other words, the camshaft measurement can occur in only one of two positions since the camshaft rotates once for every two revolutions of the crankshaft. Therefore, if the camshaft measurement does not appear where it should during an engine start, then engine position can be uniquely determined. Similarly, if the camshaft measurement does appear, then again engine position can be uniquely determined. Using this approach, engine position is found faster when it is the case that if the camshaft measurement does not appear. Further, to eliminate false determination of engine position when the camshaft measurement is absent, operating conditions must be such that said camshaft measurement is receivable.

An advantage of the above aspect of the invention is faster average engine starting time.

Another advantage of the above aspect of the invention is improved customer satisfaction, improved fuel economy, and reduced emissions.

BRIEF DESCRIPTION OF THE DRAWINGS

FIG. 2 is a schematic diagram wherein the invention is used to advantage; and FIG. 3 is a high level flow charts of various operations performed by a portion of the embodiment shown in FIG. 1.

DESCRIPTION OF AN EXAMPLE OF OPERATION

Figure 1:
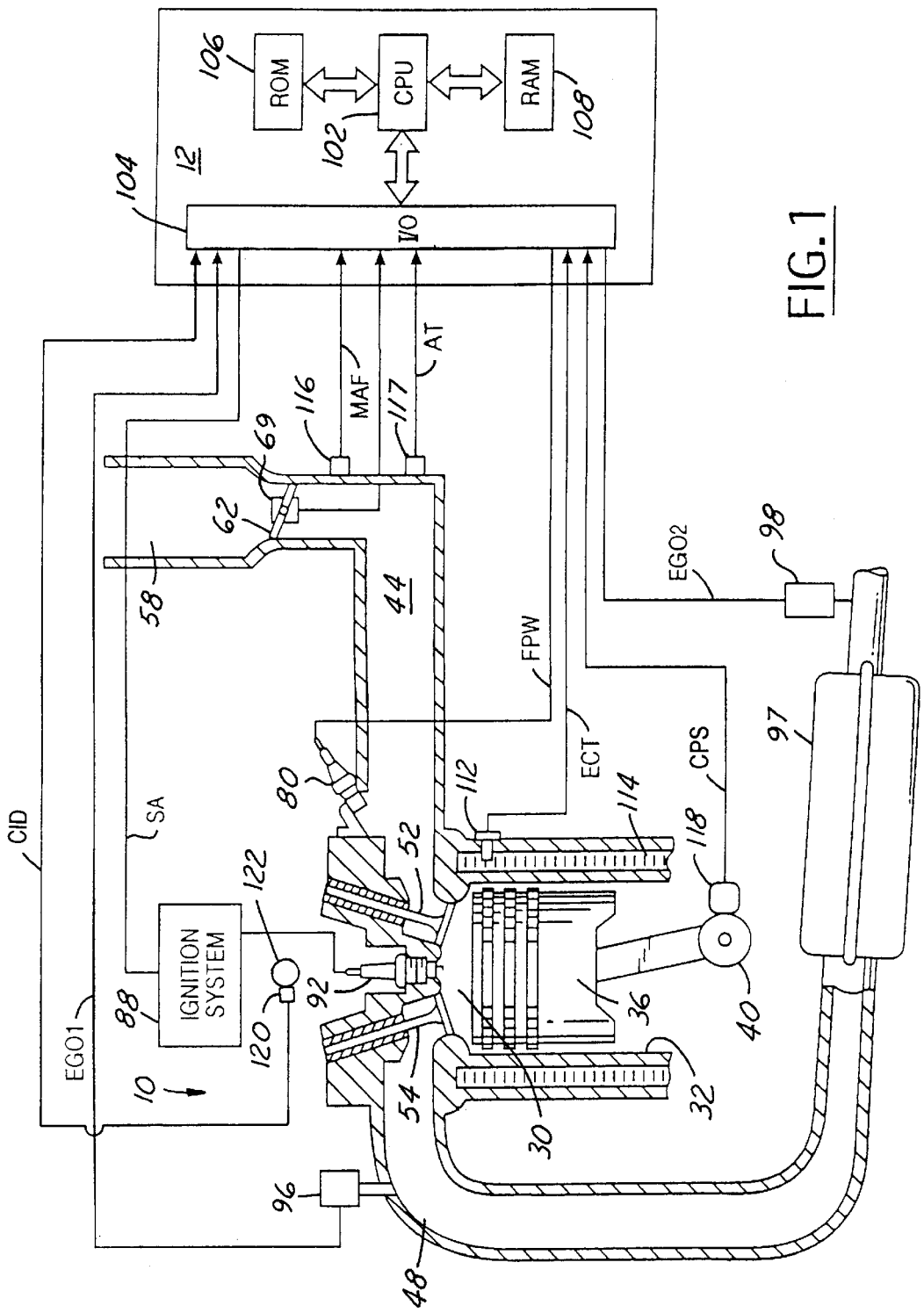
FIG. 1 is a block diagram of an embodiment wherein the invention is used to advantage.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 and exhaust valve 54. Intake manifold 44 is shown communicating with throttle body 58 via throttle plate 62. Throttle position sensor 69 measures position of throttle plate 62. Intake manifold 44 is also shown having fuel injector 80 coupled thereto for delivering liquid fuel in proportion to the pulse width of signal FPW from controller 12. Fuel is delivered to fuel injector 80 by a conventional fuel system (not shown) including a fuel tank, fuel pump, and fuel rail (not shown).

Alternatively, the engine may be configured such that the fuel is injected directly into the cylinder of the engine, which is known to those skilled in the art as a direct injection engine.

Conventional distributorless ignition system 88 provides ignition spark to combustion chamber 30 via spark plug 92 in response to controller 12. Two-state exhaust gas oxygen sensor 96 is shown coupled to exhaust manifold 48 upstream of catalytic converter 97. Two-state exhaust gas oxygen sensor 98 is shown coupled to exhaust manifold 48 downstream of catalytic converter 97. Sensor 96 provides signal EGO1 to controller 12 which converts signal EGO1 into two-state signal EGO1S. A high voltage state of signal EGO1S indicates exhaust gases are rich of a reference air/fuel ratio and a low voltage state of converted signal EGO1 indicates exhaust gases are lean of the reference air/fuel ratio. Sensor 98 provides signal EGO2 to controller 12 which converts signal EGO2 into two-state signal EGO2S. A high voltage state of signal EGO2S indicates exhaust gases are rich of a reference air/fuel ratio and a low voltage state of converted signal EGO2S indicates exhaust gases are lean of the reference air/fuel ratio.

Controller 12 is shown in FIG. 1 as a conventional microcomputer including; microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of mass air flow measurement (MAF) from mass flow sensor 116 coupled to intake manifold 44; a measurement (MT) of manifold temperature from temperature sensor 117; a crankshaft position signal (CPS) from Hall effect sensor 118 coupled to crankshaft 40, a camshaft signal (CID) from sensor 120 coupled to camshaft 122. In a preferred aspect of the present invention, engine speed sensor can be determined from the information provided by the CPS sensor 118.

In a preferred embodiment, crankshaft position signal (CPS) senses teeth (not shown) coupled to crankshaft 40. In addition, there is a location of a missing tooth (not shown). As is known to those skilled in the art, controller 12 is adapted to recognize the missing tooth and thereby determine position of crankshaft 40. In addition, camshaft signal, also termed cylinder identification signal, (CID), is produced once for every two revolutions of crankshaft 40.

Referring now to FIG. 2, a diagram showing an example configuration according to the present invention for four cylinder, six cylinder, and eight cylinder engines. However, as one skilled in the art will recognize, the approach of the present invention can be applied to an engine having any number of cylinders.

Continuing with FIG. 2, the diagram shows engine crankshaft position and the location of the missing crankshaft tooth and the location of the CID signal. Also shown by $\overline{\text{CID}}$ is a position directly opposite the location of the CID signal. According to the present invention, and as will be described later herein with particular reference to FIG. 3, it is possible to determine engine position during engine starting once the missing tooth has been received and either the absence or presence of the CID signal has been determined. For example, consider an eight cylinder engine that starts at point 1a. As the engine is started and rotates in the direction of arrow 210, the missing tooth is identified at point 2a. At this point, the engine is in one of two positions and sequential fuel injection is not yet performed. Then, as the engine continues to rotate, signal CID is identified at point 3a. At point 3a, it is possible to uniquely determine engine position, determine which cylinder(s) is(are) currently inducting fresh air and fuel, and perform sequential fuel injection.

Continuing with FIG. 2, now consider an eight cylinder engine that starts at point 1b. As the engine is started and rotates in the direction of arrow 210, the missing tooth is identified at point 2b. At this point, the engine is in one of two positions and sequential fuel injection is not yet performed. Then, as the engine continues to rotate, signal CID is not identified at point 3b. At point 3b, it is possible to uniquely determine engine position, determine which cylinders is(are) currently inducting fresh air and fuel, and perform sequential fuel injection. In other words, at location $\overline{\text{CID}}$, which represents where a CID signal would be if the crankshaft was 360° away from this position, engine position can be determined. Since the engine can be in only one of two position, either at CID or $\overline{\text{CID}}$, since signal CID was not received, the crankshaft must be at point 3b.

Referring now to FIG. 3, a routine for determining engine position is described. First, in step 310, a determination is made as to whether missing tooth on crankshaft 40 has been located. When the answer to step 310 is YES, the routine continues to step 312 where a determination is made as to whether a CID signal has been received. When the answer to step 312 is NO, a determination is then made in step 314 whether engine speed is fast enough for recognizing the CID signal. When the answer to step 314 is NO, the routine returns to step 312. Otherwise, when the answer to step 314 is YES, a determination is then made in step 316 as to whether signal CID should have been received. In other words, in step 316, the routine determines whether the engine has rotated a predetermined amount from the missing tooth. Thus, according to the present invention, the engine has rotated the predetermined amount from the missing tooth, and a CID signal has not been received. When the engine speed is high enough so that a CID signal can be recognized, then the engine is 360° from receiving the CID signal and engine position can be uniquely determined. When the answer to step 316 is NO, the routine returns to step 312. Otherwise, when the answer to step 316 is YES, the routine continues to step 318. In step 318, the routine determines engine position. Then, in step 320, sequential fuel injection is commenced.

Continuing with FIG. 3, when the answer to step 312 is YES, the routines continues to step 322. In step 322, the routine determines engine position from the CID signal determining engine position during engine starting.

In a preferred embodiment, the predetermined amount of engine rotation is calculated as the amount of engine rotation from the missing tooth to the CID signal, which is represented by the distance measured clockwise from point 2a to point 3a in FIG. 2 for the example of an eight cylinder engine. Also, a certain amount of margin can be added to the predetermined amount of engine rotation to account for sensor noise, engine rotation oscillations, and other engine starting effects.

In an alternate embodiment, the predetermined amount of engine rotation is adjusted based on engine speed to account for delays in measuring the camshaft and the crankshaft signals.

While the invention has been shown and described in its preferred embodiments, it will be clear to those skilled in the arts to which it pertains that many changes and modifications may be made thereto without departing from the scope of the invention. For example, other operating parameters in replace of, or in addition to engine speed, can be used for determining whether signal CID is receivable. For example, operating conditions that affect the strength of signal CID can be used, such as, engine temperature, ambient temperature, or sensor temperature.

We claim:

1. A method for determining engine position based on a signal coupled to the engine, the engine having a camshaft and a crankshaft, the method comprising:

calculating engine position based on an absence of the signal when said signal is absent for a predetermined amount of engine rotation; and calculating engine position based on the presence of the signal otherwise.

2. The method recited in claim 1 further comprising beginning sequential fuel injection based on said calculated engine position.

3. The method recited in claim 1 wherein said calculating engine position further comprises determining cylinder identification after said predetermined amount of engine rotation when an engine speed is greater than a predetermined value.

4. The method recited in claim 1 wherein said predetermined amount of engine rotation is based on a crankshaft angle between a missing tooth on the crankshaft and a tooth on the camshaft.

5. The method recited in claim 1 wherein said predetermined amount of crankshaft rotation is based on a number of cylinders in the engine.

6. The method recited in claim 1 wherein the method is executed during an engine starting period.

7. A method for determining engine position based on a signal coupled to the engine, the engine having a camshaft and a crankshaft, the method comprising:

calculating engine position based on an absence of the signal when said signal is absent for a predetermined amount of engine rotation;

calculating engine position based on the presence of the signal otherwise; and after said detecting, beginning sequential fuel injection.

8. The method recited in claim 7 wherein said predetermined duration is based on an amount of crankshaft rotation.

9. The method recited in claim 7 wherein said predetermined duration is based on an amount of engine rotation.

10. The method recited in claim 7 wherein said predetermined duration starts when a position of the crankshaft is detected and ends after a predetermined amount of crankshaft rotation.

11. The method recited in claim 10 wherein predetermined amount of crankshaft rotation is based on a crankshaft angle between a missing tooth on the crankshaft and a tooth on the camshaft.

12. The method recited in claim 11 wherein said predetermined amount of crankshaft rotation is further based on a number of cylinders of the engine.

13. A system comprising:

an engine having a camshaft and a crankshaft;

a camshaft sensor for sensing rotation of said camshaft;

a crankshaft senor for sensing rotation of said crankshaft; and a controller receiving a camshaft sensor signal and a crankshaft sensor signal, said controller calculating engine position based on said crankshaft sensor signal and an absence of said camshaft sensor signal when said camshaft sensor signal is absent for a predetermined amount of crankshaft rotation, and calculating engine position based on said crankshaft sensor signal and said camshaft sensor signal otherwise.

14. A method for determining engine position based on a signal coupled to the engine, the engine having a camshaft and a crankshaft, the method comprising:

providing an indication that the signal is receivable; and in response to said indication, calculating engine position based on an absence of the signal when the signal is absent for a predetermined amount of engine rotation.

15. A method for determining engine position based on a signal coupled to the engine, the engine having a camshaft and a crankshaft, the method comprising:

providing an indication that the signal is receivable;

in response to said indication, calculating engine position based on an absence of the signal when the signal is absent for a predetermined amount of engine rotation; and calculating engine position based on a presence of the signal when the signal is present before said predetermined amount of engine rotation.

16. The method as set forth in claim 15 wherein the method is executed during an engine starting period.

17. The method as set forth in claim 16 wherein said operating condition is engine speed.

18. The method as set forth in claim 15 wherein said indication that the signal is receivable is based on an operating condition.

19. The method as set forth in claim 15 wherein said operating condition is engine temperature.

* * * * *